United States Patent [19]

Idei et al.

[11] Patent Number: 4,811,085
[45] Date of Patent: Mar. 7, 1989

[54] VIDEO SIGNAL SYNTHESIZER FOR PRODUCING A PICTURE IN-PICTURE EFFECT ON A DISPLAY

[75] Inventors: Toshio Idei; Yoshiki Mizutani, both of Nagaokakyo, Japan

[73] Assignee: Mitsubishi Denki Kabushiki Kaisha, Tokyo, Japan

[21] Appl. No.: 49,149

[22] Filed: May 13, 1987

[30] Foreign Application Priority Data

May 14, 1986 [JP] Japan .............................. 61-112001
May 26, 1986 [JP] Japan .............................. 61-120593

[51] Int. Cl.$^4$ ...................... H04N 9/76; H04N 9/74; H04N 9/475
[52] U.S. Cl. ...................................... 358/22; 358/315
[58] Field of Search ............... 358/22, 324, 325, 326, 358/35, 183, 148

[56] References Cited

U.S. PATENT DOCUMENTS 3,909,839  9/1975  Inaba et al. ........................... 358/17
4,249,198  2/1981  Ito et al. ............................... 358/13
4,712,130  12/1987 Casey .................................... 358/22

FOREIGN PATENT DOCUMENTS 171291  8/1986  Japan.

Primary Examiner—James J. Groody
Assistant Examiner—Robert M. Bauer
Attorney, Agent, or Firm—Birch, Stewart, Kolasch & Birch

[57] ABSTRACT

A video signal synthesizer for producing a picture-in-picture effect on a display device utilizes a phase locked loop circuit to generate a carrier wave synchronized with a color burst signal of a composite video signal representing a main picture to be reproduced, which carrier wave is used to modulate a time compressed second composite signal which represents a sub-picture to be superimposed on the main picture. A time division multiplexer is used to multiplex the first and time compressed second video signals to produce a picture-within-a-picture video signal for application to the receiver of a display device. By using a carrier wave generated from a phase locked loop circuit, the color subcarrier signals of both the main and sub-picture signals have the identical frequency.

4 Claims, 2 Drawing Sheets

VIDEO SIGNAL SYNTHESIZER FOR PRODUCING A PICTURE IN-PICTURE EFFECT ON A DISPLAY

BACKGROUND OF THE INVENTION

1. Field of Technology

The present invention generally relates to a video signal synthesizer operable to provide a multiplex video signal for producing a so-called picture-in-picture effect on a display screen of a display device, for example, a cathode ray tube.

2. Description of the Prior Art

A color television receiver of a type capable of reproducing a plurality of pictures simultaneously on one display screen of a cathode ray tube is well known and is currently commercially available. This video signal reproduction may be referred to as a picture-in-picture effect or a multiplexed picture reproduction, and is accomplished by the use of a video signal synthesizer which is generally incorporated in a television receiver and/or a video tape recording and/or reproducing apparatus although it is not always so limited. The prior art video signal synthesizer will be discussed in detail with reference to FIG. 2 of the accompanying drawings.

Referring to FIG. 2, reference numeral 11 represents a first input terminal adapted to be coupled to a first composite video signal representative of a main picture to be reproduced on the display screen, and reference numeral 15 represents a second input terminal adapted to be coupled to a second composite video signal representative of a sub-picture to be reproduced on the display screen on a reduced scale relative to the size of the main picture. The first input terminal 11 is connected to a first YC separator 12, which is in turn connected to a first chroma demodulator 13, and also with first sync separator 14. The second input terminal 15 is connected to a second YC separator 16, which is in turn connected to a second chroma demodulator 18, and also to a second sync separator 17. The first and second sync separators 14 and 17 are connected with respective first and second controllers 32 and 33 included in respective first and second digital signal processing circuits.

Reference numerals 19, 20 and 21 represent first, second and third analog-to-digital converters (A/D converters), respectively. These A/D converters 19 to 21 are connected to digital-to-analog converters (D/A converters) 25, 26 and 27 through digital memories 22, 23 and 24, respectively, each of said digital memories 22 to 24 being of a type capable performing both of information write-in and read-out at different timings.

Reference numeral 28 represents an analog switch assembly including three switches, reference numeral 29 represents a chroma modulator, reference numeral 30 represents a YC adder and reference numeral 31 represents an output terminal. It is to be noted that the first sync separator 14 and the first controller 32 altogether constitutes a timing control means 1 operable to control the timing a operation of the first to third digital memories 22 to 24, the timing of conversion performed by the first to third D/A converters 25 to 27 and the switching timing of the analog switch assembly 28.

The prior art video signal synthesizer of the construction described above is so designed as to operate in the following manner. The first composite video signal applied to the first input terminal 11 is fed to the first YC separator 12 operable to separate the first composite video signal into a first luminance signal 34 and a first color subcarrier signal 35. The first color subcarrier signal 35 is then applied to the first chroma demodulator 13 at which it is demodulated into a first red-color difference signal 36 and a first blue-color difference signal 37.

On the other hand, the second composite video signal applied to the second input terminal 15 is fed to the second YC separator 16 operable to separate the first composite video signal into a second luminance signal 38 and a second color subcarrier signal 39. The second color subcarrier signal 39 is then applied to the second chroma demodulator 18 at which it is demodulated into a second red-color difference signal 40 and a second blue-color difference signal 41.

The second luminance signal 38, the second red-color difference signal 40 and the second blue-color difference signal 41 are converted by the first, second and third A/D converters 19, 20 and 21 ino digital signals, respectively, and are then written in the associated first, second and third digital memories 22, 23 and 24. First and second control signals 42 and 43 required for the write-in control are generated from the controller 33 provided in the second digital signal processing circuit at a timing synchronized with a synchronizing signal 44 separated by the second sync separator 17, that is, the second color composite video signal.

When respective contents of the first to third digital memories 22 to 24 are to be read out, the reduction of the sub-picture, that is, the compression of the signal on the time axis, is effected. The time compression can be accomplished to 1/k if the speed of read-out operation is selected to be k-times the speed of write-in operation, wherein k is a positive integer. The second luminance signal 38, the second red-color difference signal 40 and the second blue-color difference signal 41 read out from the respective first to third digital memories 22 to 24 are in turn applied to the respective first to third D/A converters 25 to 27 whereat they are converted into the respective analog signals 45, 46 and 47, the analog signals 45 to 47 being the time-compressed versions of the second luminance signal 38, the red-color difference signal 40 and the blue-color difference signal 41 which are hereinafter referred to as a third luminance signal, a third red-color difference signal and a third blue-color difference signal, respectively. In other words, the second luminance sigal 38, the red-color difference signal 40 and the blue-color difference signal 41 are compressed in time through the second digital signal processing circuit to provide the third luminance signal 45, the third red-color difference signal 46 and the third blue-color difference signal 47, respectively. These signals 45 to 47 are in turn applied to the analog switch assembly 28.

Third and fourth control signals 48 and 49 required for the third luminance signal 45, the third red-color difference signal 46 and the third blue-color difference signal 47 to be read out from the digital signal processing circuit are generated from the controller 32 provided in the timing control circuit 1 at a timing synchronized with a synchronizing signal 50 separated by the first sync separator 14, from the first composite video signal which represents the main picture. Since the control signals 48 and 49 are synchronized with the first composite video signal, the third luminance signal 45, the third red-color difference signal 46 and the third blue-color difference signal 47 are also synchronized with the first composite video signal.

The analog switch assembly 28 is utilized to effect time-division multiplexing of the main picture signal and the sub-picture signal which has been time-compressed, and a switching command 51 which is used to operate the analog switch assembly 28 and generated from the first controller 32 is synchronized with the main picture signal. The luminance signal selected by the analog switch assembly 28 is in turn applied to the adder 30 whereas the red-color difference signal and the blue-color difference signal which have been selected by the analog switch assembly 28 are, before being supplied to the adder 30, modulated by the chroma modulator 29 into a color subcarrier wave. The adder 30 performs a summation of the luminance signal and the color subcarrier wave both applied thereto from the analog switch assembly 28 thereby to provide a synthesized color composite video signal at the output terminal 31.

While the prior art video signal synthesizer is constructed as hereinbefore described, it has been found disadvantageous in that, since demodulation and modulation are conducted on the main picture signal which does not require time-compression, this leads to not only complication of the apparatus itself, but also reduction in quality of the picture being reproduced. Moreover, the use of time-division multiplexing requires the use of the switch assembly of three switching circuit systems and, therefore, when it is desired to increase the number of sub-pictures that can be reproduced through a cathode ray tube display, the apparatus requires a correspondingly increased manufacturing cost.

SUMMARY OF THE INVENTION

Accordingly, the present invention has been devised with a view to substantially obviating the above discussed disadvantages and inconveniences inherent in the prior art color video signal synthesizer and has for its principal object to provide an improved, inexpensive video signal synthesizer wherein no substantial reduction in quality of the main picture occurs and wherein the analog switch assembly used may be of a type including a single switching system.

In order to accomplish the above described object, the video signal synthesizer herein disclosed according to the present invention is such that a PLL (phase-locked loop) circuit is employed to generate a carrier wave synchronized with a color burst signal contained in the composite video signal for the reproduction of the main picture. The carrier wave so generated from the PLL circuit is utilized to re-modulate the sub-picture signal which has been time-compressed, the modulated sub-picture signal being then subjected to time-division multiplexing through the analog switch assembly.

The carrier wave generated from the PLL circuit for re-modulating the sub-picture signal, that is, the composite video signal used to reproduce the sub-picture, is synchronized with the color burst signal contained in the main picture signal, that is, the composite video signal used to reproduce the main picture. Therefore, both color subcarrier waves of the main picture signal and the sub-picture signal come to have the same frequency and, hence, the time-division multiplexing of the main picture signal and the sub-picture signal through the analog switch assembly is possible without altering the characteristics of the color composite video signal while the necessity of the main picture signal being demodulated and modulated is obviated.

BRIEF DESCRIPTION OF THE DRAWINGS

The present invention will become more clearly understood from the following detailed description of a preferred embodiment thereof, when taken in conjunction with the accompanying drawings. However, the embodiment and the drawings are given for the purpose of illustration and explanation only, and are not to be taken as being limitative of the present invention in any way whatsoever, the scope of which is to be determined solely by the appended claims. In the drawings, like reference numerals denote like parts in the several views, and:

DETAILED DESCRIPTION OF THE EMBODIMENT

Before the detailed descripton of the present invention proceeds, it is to be noted that like circuit components of the prior art system which are also used in the system of the present invention will not be discussed in detail for the sake of brevity.

Figure 1:
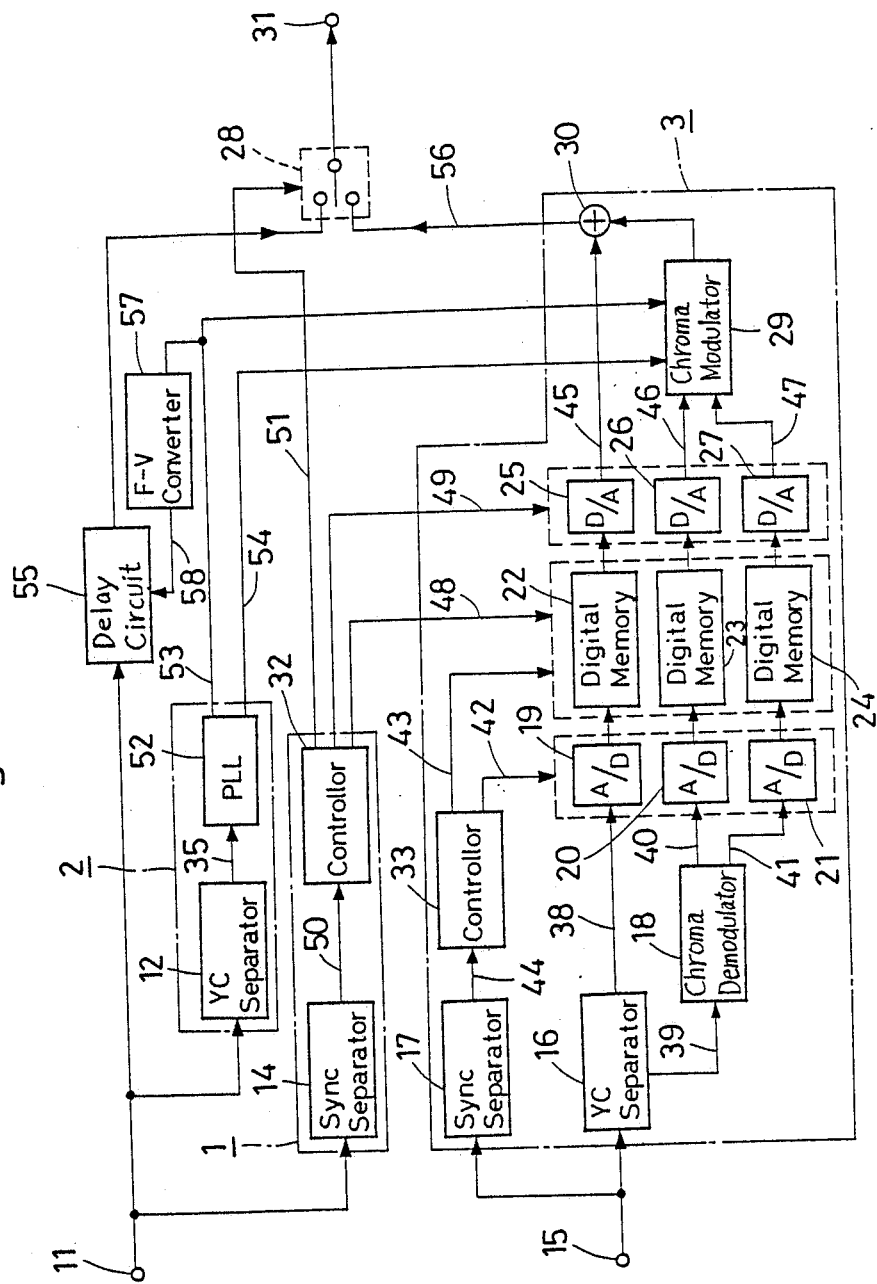
FIG. 1 is a block circuit diagram showing a color video signal synthesizer embodying the present invention.
Figure 2:
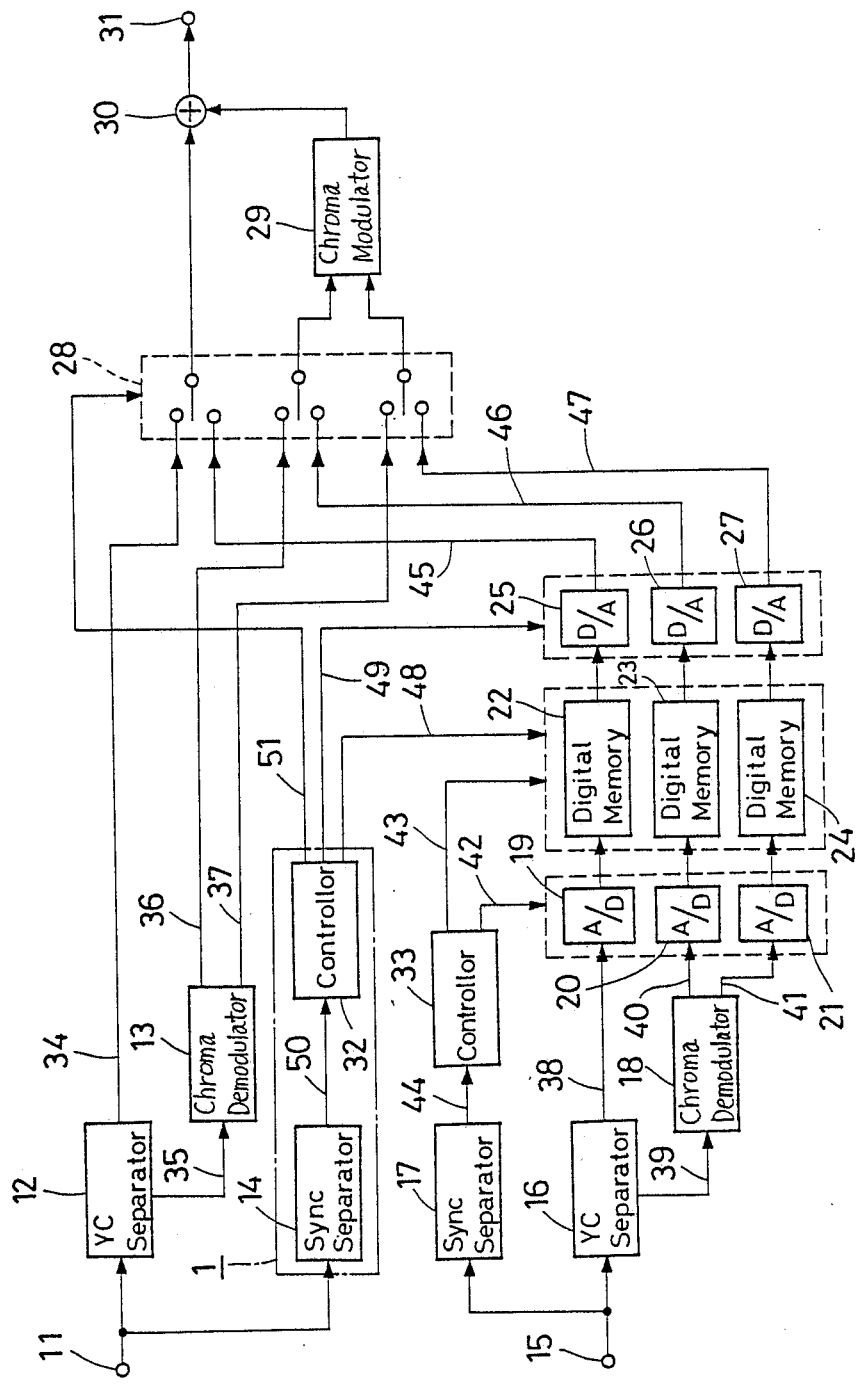
FIG. 2 is a block circuit diagram showing the prior art color video signal synthesizer, reference to which has already been made.

Referring now to FIG. 1, for generating a carrier wave synchronized with a color burst signal contained in the composite video signal for the reproduction of the main picture, a phase-locked loop (PLL) circuit identified by 52 is connected between the first YC separator 12 and the chroma modulator 29, and the PLL circuit 52 constitutes, together with the first YC separator 12, a carrier wave generating means 2. The PLL circuit 52 generates first and second carrier waves 53 and 54 which are in turn applied to the chroma modulator 29 for the modulation of the demodulated chroma signal outputted from the chroma demodulator 18.

For delaying the first composite video signal by a predetermined time so that the respective color subcarrier waves contained in the main-picture signal and the sub-picture signal can match in phase with each other, there is provided a delay circuit 55, for example, a voltage-controlled delay circuit, connected between the first input terminal 11 and the analog switch assembly 28. The analog switch assembly 28 can be triggered by a first control signal 51 generated from the first controller 32.

The video signal synthesizer according to the present invention operates in the following manner. The PLL circuit 52 generates the first and second carrier waves 53 and 54. The first and second carrier waves 53 and 54 output from the PLL circuit 52 are synchronized in phase with the color burst signal included in the first color subcarrier wave signal 35 separated by the YC separator 12, but are shifted 90° in phase from each other. The time-compressed third red-color and blue-color difference signals 46 and 47 output from the D/A circuits 26 and 27, respectively, are applied to the chroma modulator 29 at which they are modulated by the first and second carrier waves 53 and 54 generated from a PLL circuit 52, thereby producing the chroma signal which is in turn synthesized by the adder 30 into the composite video signal, or sub-picture signal 56, utilized to reproduce the sub-picture within the framework of the main picture concurrently reproduced. It is to be noted that the second YC separator 16, the second sync separator 17, the second chroma demodulator 18, the A/D converters 19, 20 and 21, the digital memories 22, 23 and 24, the D/A converters 25, 26 and 27, the chroma modulator 29, the adder 30 and the second controller 33 altogether constitute a sub-picture signal time compressing means 3.

The sub-carrier wave of the picture signal 56 which has been time-compressed and the sub-carrier wave of the main picture signal have the same frequency, but are shifted out of phase from each other because of the difference in operating characteristics of the signal paths through which the sub-picture signal and the main picture signal are transmitted, respectively. The difference in phase between the sub-carriers of the main picture and sub-picture signals constitutes a cause of a color displacement appearing on the screen of the cathode ray tube display between the main picture and the sub-picture, and, therefore, should be avoided. For this purpose, the delay circuit 55 is provided compensate for the phase shift so that the subcarrier waves of the main picture and sub-picture signals can be brought in phase with each other.

The delay circuit 55 so far shown is employed in a form of the voltage-controlled delay circuit and is controlled by a voltage 58 applied from a F-V (frequency-to-voltage) converter 57. This F-V converter 57 is so positioned and so operable as to generate the control voltage 58 which is a function of the frequency of one of the first and second carrier waves 53 and 54, for example, the first carrier wave 53 as shown, whereby the phase matching of the respective subcarrier waves of the main picture and the sub-picture signals applied to the analog switch assembly 28 can be automatically performed.

It is to be noted that, since the operating characteristics of the signal paths for the main picture and sub-picture signals are fixed once the design of the circuit of the synthesizer has been fixed in practice, the sub-picture signal has a fixed amount of delay in phase against the main picture signal. Therefore, the delay time of the delay circuit 55 may have a predetermined delay time characteristic. However, the frequency of the color burst signal included in the main picture signal tends to vary to a certain extent relative to the rating, accompanied by a corresponding variation of the respective frequencies of the first and second carrier waves 53 and 54 emerging from the PLL circuit 52.

Where the delay time of the delay circuit 55 is fixed, the amount of delay in phase varies with change in frequency of any one of the first and second carrier waves 53 and 54. Therefore, in order for the amount of delay in phase to be maintained at a predetermined value, the F-V converter 57 is used to permit the delay circuit 55 to compensate for a delay time in response to the control voltage applied thereto from the F-V converter 57.

It is, however, to be noted that, if the frequency variation of the color burst signal included in the main picture signal is negligible, the use of the F-V converter 57 can be eliminated.

It is also to be noted that although in the illustrated embodiment of the present invention the delay circuit 55 is inserted in the signal path for the main picture signal, it may be inserted in the signal path for the sub-picture signal 56 which has been time-compressed. More specifically, the delay circuit may be inserted between the adder 30 and the analog switch assembly 28.

From the foregoing description of the present invention, it has now become clear that the video signal synthesizer according to the present invention is such that a PLL (phase-locked loop) circuit is employed to generate a carrier wave synchronized with a color burst signal contained in the composite video signal for the reproduction of the main picture, which carrier wave is utilized to re-modulate the sub-picture signal which has been compressed with respect to time, the modulated sub-picture signal being then subjected to time-division multiplexing through the analog switch assembly. The carrier wave generated from the PLL circuit for re-modulating the sub-picture signal is synchronized with the color burst signal contained in the main picture signal, and, therefore, both color subcarrier waves of the main picture signal and the sub-picture signal come to have the same frequency and, hence, time-division multiplexing of the main picture signal and the sub-picture signal is possible without altering the characteristics of the color composite video signal while the necessity of the main picture signal being demodulated and modulated can be obviated.

Although the present invention has been fully described with reference to the accompanying drawings in connection with the preferred embodiment thereof taken only for the purpose of illustration, various changes and modifications can readily be conceived by those skilled in the art upon the reading of the disclosure herein made. BY way of example, although in the foregoing embodiment reference has been made to reproduction on a cathode ray tube display of only one sub-picture within the framework of the main picture, arrangement can be made to enable two or more sub-pictures to be reproduced within the framework of the main picture. This can be accomplished if the sub-picture signal time-compressing means including the terminal 15, the second YC separator 16, the second sync separator 17, the second chroma demodulator 18, the A/D converters 19, 20 and 21, the digital memories 22, 23 and 24, the D/A converters 25, 26 and 27, the chroma modulator 29, the adder 30 and the controller 33 and generally identified by 3 in FIG. 1 is used in a number equal to the number of sources of composite video signals desired to be reproduced in superimposed relationship with the main picture being reproduced on the cathode ray display. Nevertheless, in such case, the control signals 48, 49, 53 and 54 are utilized in common to all of the time-compressing means 3 and the analog switch assembly 28 should have switching positions equal to the number of the composite video signal sources.

Accordingly, such changes and modifications are to be construed as included within the scope of the present invention as defined by the appended claims unless they depart therefrom.

We claim:

1. A video signal synthesizer, comprising:
    carrier wave generating means for generating a carrier wave synchronized with a color burst signal of a first composite video signal representing a main picture image to be reproduced;
    time-compressing means for compressing a second composite video signal representing a sub-picture image to be superimposed on said main picture image, on a time axis, including separation means for separating said second composite signal into a luminance signal and a color difference signal, converting means for converting said luminance and color difference signals into time-compressed luminance and color difference signals, modulation means for modulating said time-compressed color difference signal on said carrier wave, and adding means for adding said time-compressed luminance and modulated color difference signals to produce a time-compressed second composite video signal;

means for synchronizing the phases of said first composite and time-compressed second composite video signals;

time-division multiplexing means for multiplexing said phase-synchronized time-compressed second composite video signal and first composite video signal; and control means for controlling the operation of said time-compressing means and said multiplexing means in synchronism with said first composite video signal.

2. The synthesizer claimed in claim 1, wherein said synchronizing means comprises a delay circuit.

3. The synthesizer claimed in claim 1, wherein said synchronizing means comprises a voltage-controlled delay circuit, further comprising a frequency-to-voltage converter for generating a control voltage to be applied to the delay circuit, which control voltage is a function of the frequency of the carrier wave.

4. A video signal synthesizer comprising:

a first input terminal to which a first composite video signal representing a main picture on a screen of a display device is applied;

at least one second input terminal to which a second composite video signal representing a sub-picture to be superimposed with the main picture is applied;

memory means for storing first and second component signals constituting said second composite video signal;

encoder means for synthesizing a third composite video signal from the first and second component signals read out from the memory means at a speed higher than the speed at which the first and second component signals have been read into the memory means;

a phase locked loop circuit for generating a carrier wave utilized for modulation in the encoder means, said carrier wave being synchronized in phase with a color subcarrier wave of the first composite video signal;

a frequency-to-voltage converter for outputting a control voltage which is a function of the frequency of the subcarrier wave of the first composite video signal;

a voltage-controlled delay circuit operable in response to said control voltage for adjusting a delay time of said delay circuit required to delay one of the first and third composite video signals; and switching means operable in synchronism with said first composite video signal for selectively outputting one of said first and third composite video signals, one of said first and third composite video signals having been delayed by said delay circuit.

* * * * *